United States Patent [19]

Yasui et al.

[11] Patent Number: 5,834,917
[45] Date of Patent: Nov. 10, 1998

[54] ROBOT CONTROLLER

[75] Inventors: Keiji Yasui, Kawanishi; Masahiro Oto, Hirakata, both of Japan

[73] Assignee: Matsushita Electric Industrial Co., Ltd., Osaka, Japan

[21] Appl. No.: 982,378

[22] Filed: Dec. 2, 1997

[30] Foreign Application Priority Data

Dec. 3, 1996 [JP] Japan .................................. 8-322563

[51] Int. Cl.$^6$ ....................................................... B25J 9/12
[52] U.S. Cl. ........................... 318/568.11; 318/566; 901/9
[58] Field of Search ..................................... 318/560, 561, 318/566, 567, 568.1, 568.11, 41; 388/930; 901/2, 9, 23, 30, 34, 38

[56] References Cited

U.S. PATENT DOCUMENTS

| | | | |
|---|---|---|---|
| 4,943,759 | 7/1990 | Sakamoto et al. | 318/568.11 |
| 5,414,799 | 5/1995 | Seraji | 395/95 |
| 5,418,440 | 5/1995 | Sakaguchi et al. | 318/560 |

*Primary Examiner*—Bentsu Ro
*Attorney, Agent, or Firm*—McDermott, Will & Emery

[57] ABSTRACT

A robot controller comprises, (1) a servo motor driving a robot manipulator, (2) a motor current detector which detects a current driving the servo motor, (3) a motor rotational speed detector which detects a rotational speed of the servo motor, (4) a disturbance detector which detects a disturbance torque loaded to the robot manipulator by using the motor rotational speed and the motor current, (5) a force control calculator which outputs a force-control-instruction value responsive to a disturbance torque detected by the disturbance detector, and (6) a move restriction calculator which performs a force control by adding a force-control-instruction value to a regular position-instruction value of the robot manipulator. Further, the move restriction calculator switches a force control direction according to a move-restriction-direction-instruction value, and adds the force-control-instruction value to the regular position-instruction value of the robot manipulator so that the force control may move along a restricted direction which has been taught.

12 Claims, 8 Drawing Sheets

ROBOT CONTROLLER

FIELD OF THE INVENTION

The present invention relates to a robot controller, more particularly, to a robot controller performing a force control by driving a robot manipulator with a servo-motor and by employing a teaching & playing back method.

BACKGROUND OF THE INVENTION

A conventional robot controller moves in this way: when external force is applied to a robot manipulator, a force control moves so that the robot may follow up the external force, i.e. the robot controller has the manipulator follow up the external force without using a force sensor to perform a force control. This robot controller is laid open as a Japanese unexamined patent with No. H06-39760.

The above prior art is detailed as this: when the external force is applied to the robot manipulator, a displacement value of a position is added to a value of a position instruction responsive to an increased value of motor current from a static robot status, thereby the robot manipulator moves. As a result, a force control is performed by following up the external force without disposing a force sensor on a tip of the robot manipulator.

In the above prior art; however, there are a few problems, e.g. an external force is calculated based on a motor current at the static robot status, therefore, a force control cannot be applied to the moving robot in a playback mode. Further, because the prior art does not specify an escape direction for the robot manipulator, when the external force is applied thereto, the escape direction depends on the external force direction. Therefore, when a disturbance source applies the external force to the robot manipulator not so strong as locking it completely (i.e. the external force is not strong enough to halt the robot manipulator), the robot manipulator sometimes hits a jig, etc. placed near to the robot moving route.

SUMMARY OF THE INVENTION

The present invention addresses the above problems, i.e. in a robot controller performing a force control when an external force is applied to a robot manipulator without using a force sensor, the present invention provides a robot controller which has the following functions:

1. The robot controller can perform a force control even when a robot moves in the playback mode.
2. The robot controller can specify an escape direction of the robot manipulator or a tool direction of the robot when a disturbance source applies an external force to the robot manipulator not so strong as locking it completely.

Thus, the robot controller according to the present invention can remove a chance for the robot manipulator being damaged.

The robot controller used in the first exemplary embodiment according to the present invention comprises the following items:

1. a servo motor which drives a robot manipulator,
2. a motor current detector which detects a motor current driving the servo motor,
3. a motor rotational speed detector which detects a rotational speed of the servo motor,
4. a disturbance detector which detects a disturbance torque by using the motor rotational speed and the motor current, when an external force is applied to the robot manipulator,
5. a force control calculator which calculates a force-control-instruction value of the robot manipulator responsive to the disturbance torque detected by the disturbance detector, and
6. a move restriction calculator which adds the force-control-instruction value to a regular position-instruction value.

The robot controller used in the second exemplary embodiment according to the present invention comprises the following items:

1. a servo motor which drives a robot manipulator,
2. a motor current detector which detects a motor current driving the servo motor,
3. a motor rotational speed detector which detects a rotational speed of the servo motor,
4. a disturbance detector which detects a disturbance torque by using the motor rotational speed and the motor current, when an external force is applied to the robot manipulator,
5. a force control calculator which calculates a force-control-instruction value of the robot manipulator responsive to the disturbance torque detected by the disturbance detector, and
6. a move restriction calculator which switches a force control direction of the robot manipulator according to an instruction value of the move restriction direction and also adds a force-control-instruction value to a regular position-instruction value in order to limit the force control toward the restricted direction only.

Further, the move restriction calculator of the robot controller used in the second exemplary embodiment adds the force-control-instruction value to the regular position-instruction value so that a tool center point of the robot manipulator may move only along a linear line direction which has been taught.

Still further, the move restriction calculator of the robot controller used in the second exemplary embodiment adds the force-control-instruction value to the regular position-instruction value so that the tool center point of the robot manipulator may move only within a plane vertical to the linear line direction which has been taught.

More further, the move restriction calculator of the robot controller used in the second exemplary embodiment adds the force-control-instruction value to the regular position-instruction value so that the tool center point of the robot manipulator may move only along a circular arc which has been taught.

Still more further, the move restriction calculator of the robot controller used in the second exemplary embodiment adds the force-control-instruction value to the regular position-instruction value so that the tool center point of the robot manipulator may move only within a plane vertical to the circular arc which has been taught.

Further, the move restriction calculator of the robot controller used in the second exemplary embodiment adds the force-control-instruction value to the regular position-instruction value so that the tool center point of the robot manipulator may move only along an arbitrary curve which has been taught.

Still further, the move restriction calculator of the robot controller used in the second exemplary embodiment adds the force-control-instruction value to the regular position-instruction value so that the tool center point of the robot manipulator may move only within a plane vertical to the arbitrary curve which has been taught.

The move restriction calculator of the robot controller used in the first or second exemplary embodiment adds the force-control-instruction value to the regular position-instruction value so that a direction toward which the robot tool faces may not be changed.

According to the robot controller used in the exemplary embodiment of the present invention, when the robot moves in a playback mode, the robot controller can perform a force control without using a force sensor against an external force applied to the robot manipulator.

Therefore, according to the robot controller of the present invention, when the robot moves in the playback mode, the robot controller can specify an escape direction for the robot manipulator without using the force sensor against the external force applied to the robot manipulator. Thus, when a disturbance source applies an external force to the robot manipulator not so strong as locking it completely, the robot controller explicitly indicates the escape direction and thereby the robot manipulator can avoid hitting a jig placed nearby a moving route of the robot. As a result, the robot controller of the present invention can protect the robot manipulator from being damaged.

DESCRIPTION OF THE PREFERRED EMBODIMENTS

Figure 1:
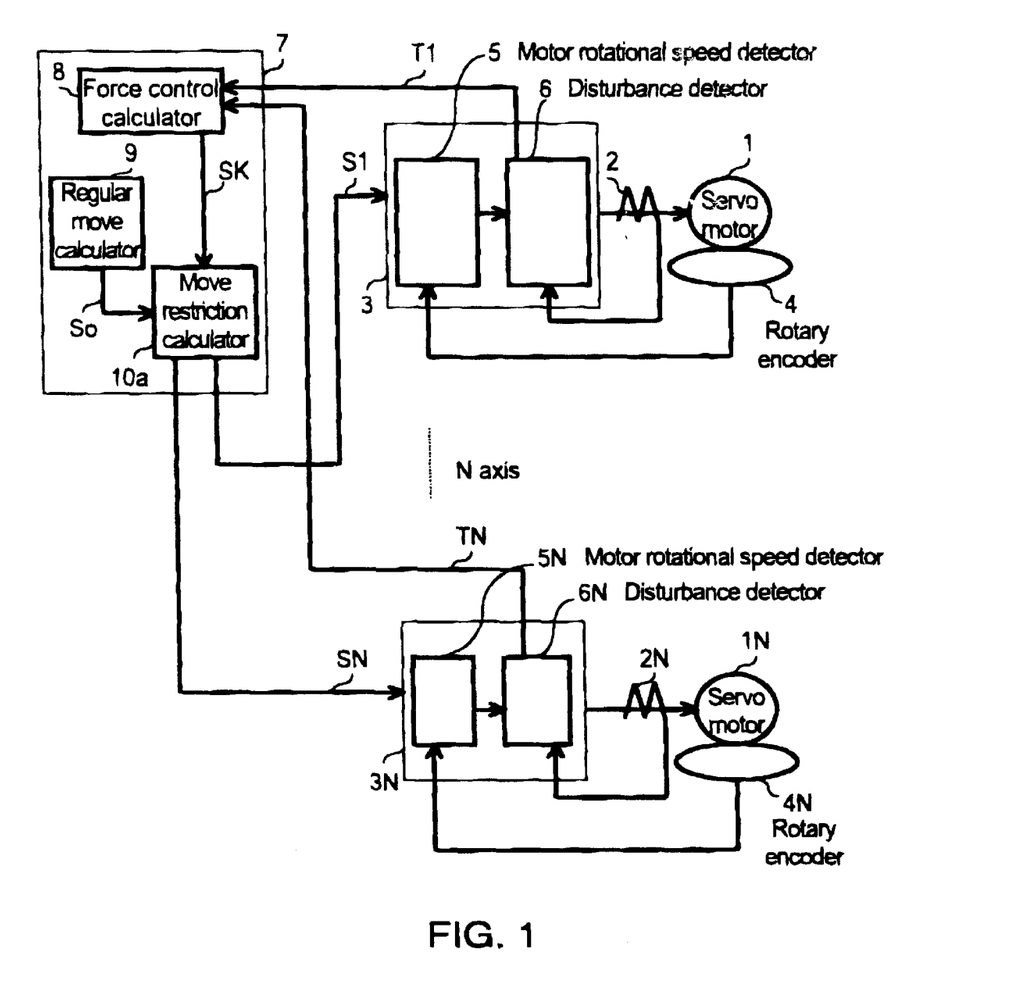
FIG. 1 is a block diagram depicting an essential part of a robot controller used in the first exemplary embodiment of the present invention.

The exemplary embodiments of the present invention are explained by referring to FIG. 1 through FIG. 9(a), (b) and (c). In these embodiments, the robot manipulator is supposed to have a number of axes of "N".
Exemplary Embodiment 1
FIG. 1 is a block diagram depicting an essential part of a robot controller used in the first exemplary embodiment of the invention. In FIG. 1, servo motors 1-1N drive a robot manipulator, and motor current detectors 2-2N detect driving currents of the servo motors 1-1N. Servo devices 3-3N comprise motor rotational speed detectors 5-5N which detect a rotational speed of the servo motors 1-1N from signals tapped off from rotary encoders 4-4N, and disturbance detectors 6-6N which detect a disturbance torque loaded to the motors from a motor rotational speed and a motor current when an external force is applied to the robot manipulator. A calculator 7 comprises a force control calculator 8 which calculates a force control value from the disturbance torque, a regular move value calculator 9 which calculates move value in a regular mode such as a playback mode, and a move restriction calculator 10a which adds a force-control-instruction value "Sk" to a regular position-instruction value "So".

Since the robot manipulator, as explained above, comprises plural move axes of an N axis, the robot manipulator has the servo motors 1-1N, the rotary encoders 4-4N and the servo devices 3-3N.

Figure 2:
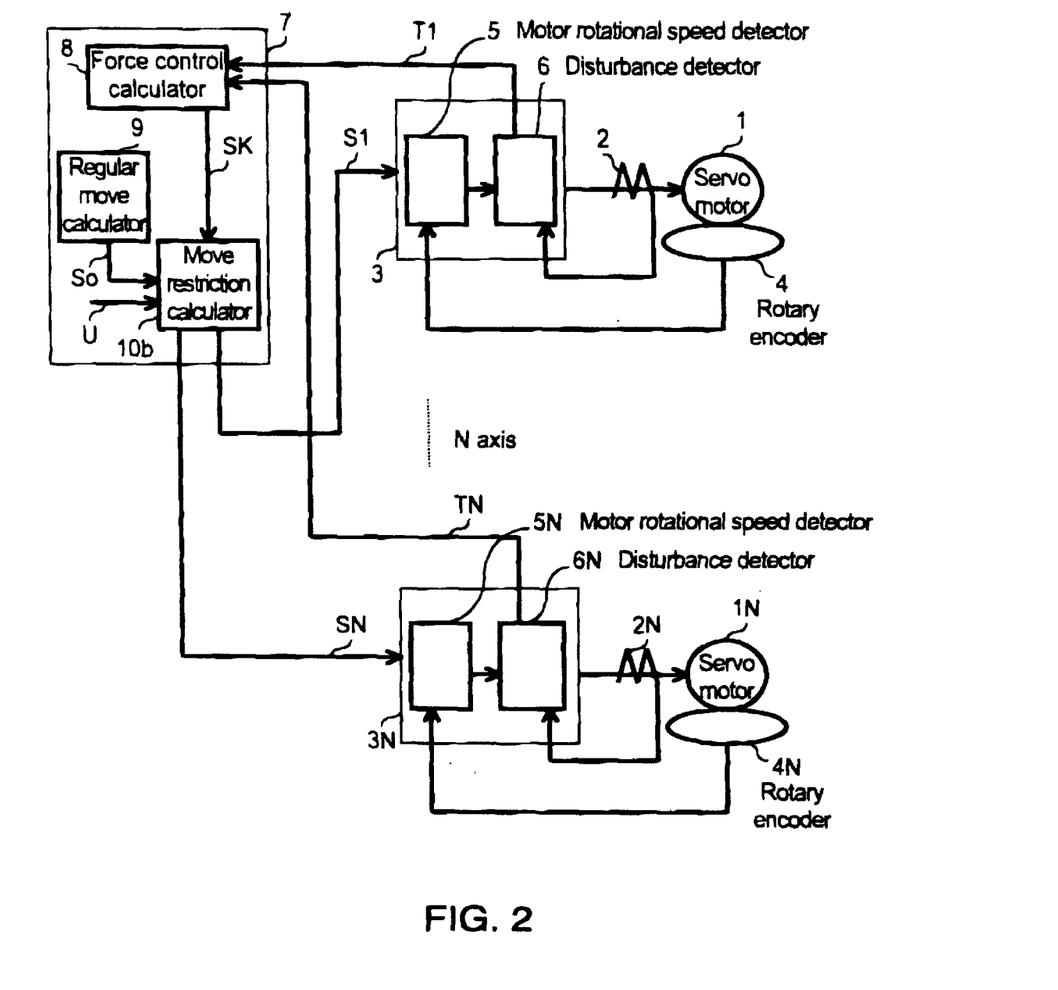
FIG. 2 is a block diagram depicting an essential part of a robot controller used in the second exemplary embodiment of the present invention.

When the external force is applied to the robot manipulator, the disturbance detectors 6-6N detect the disturbance torque loaded to the motors from the motor rotational speeds and motor currents, and then outputs disturbance torque values T1-TN. The disturbance torque values T1-TN are fed into the force control calculator 8. The force control calculator 8 calculates a force control move value using the disturbance values T1-TN, and feeds the form-control-instruction value "Sk" into the move restriction calculator 10a. The regular move calculator 9 calculates the regular position-instruction value "So" for the tool center point of the robot manipulator to be moved along the route which has been taught, and also for the tool to be directed to the taught direction. Then, the regular position-instruction value "So" is fed into the move restriction calculator 10a. The move restriction calculator 10a adds the force-control-instruction value "Sk" to the regular position-instruction value "So" and taps off position-instruction values S1-SN and sends them to the servo devices 3-3N. The servo devices 3-3N drive the servo motors 1-1N according to the fed position-instruction values S1-SN. Because the servo motors 1-1N are driven according to the position-instruction value (=the regular position-instruction value "So"+the force-control-instruction value "Sk"), the servo motors can perform a force control over the robot manipulator so that influence from the disturbance can be reduced.
Exemplary Embodiment 2
The second exemplary embodiment of the robot controller according to the present invention is explained by referring to FIG. 2. FIG. 2 shows the same structure and operation principal as shown in FIG. 1 except those of a move restriction calculator 10b. The move restriction calculator 10b in FIG. 2 has another input, namely, a move-restriction-instruction value U in addition to the regular position-instruction value "So" and the force-control-instruction value "Sk". This differs the move restriction about the operation sometimes duplicates, the following details the operation of the move restriction calculator 10b.

When the external force is applied to the robot manipulator, the disturbance detectors 6-6N detect the disturbance torque loaded to the motors from the motor rotational speeds and motor currents to output disturbance torque values T1-TN. The disturbance torque values T1-TN are fed into the force control calculator 8. The force control calculator 8 calculates a force control move value using the disturbance values T1-TN, and feeds the force-control-instruction value "Sk" into the move restriction calculator 10b. The regular move calculator 9 calculates the regular position-instruction value "So" for the tool center point of the robot manipulator to be moved along the route which has been taught, and also for the tool to be directed to the taught direction. Then, the regular position-instruction value "So" is fed into the move restriction calculator 10a. Because the move-restriction-direction-instruction value U has been fed into the move restriction calculator 10b, the force control direction over the robot manipulator can be switched according to the move-restriction-direction-instruction value U, and the move restriction calculator 10b adds the force-control-instruction value "Sk" to the regular position-instruction value "So" so that the robot manipulator may move toward a predetermined direction, and taps off position instruction values S1-SN and sends them to the servo devices 3-3N. The servo devices 3-3N drive the servo motors 1-1N according to the fed position-instruction values S1-SN. Because the servo motors 1-1N are driven according to the position-instruction value (the regular position-instruction value "So"+the force-control-instruction value "Sk", and further calculation to this addition for moving toward the direction taught as the move-restriction-direction-instruction value U), the robot manipulator can be moved toward the predetermined direction in order to avoid influence from the disturbance.

The move-restriction-direction-instruction value U which is fed into the move restriction calculator 10b is taught as teaching point information at every teaching point.

The following is the explanation about several embodiments where the move restriction calculator 10b restricts a direction of a force restriction calculation. Each embodiment explains how the robot manipulator handles an object when a disturbance torque is loaded to the motors.

Figure 3:
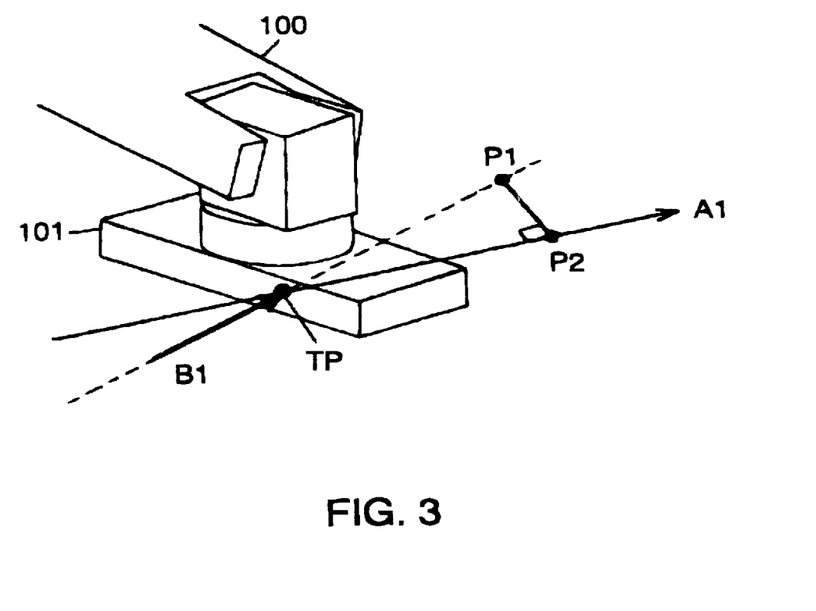
FIG. 3 illustrates, in the robot controller used in the second exemplary embodiment of the present invention, how a move restriction calculator restricts a force control direction to a linear line.

FIG. 3 depicts a case where the move restriction calculator 10b calculates a direction of a force control when an external force is applied to the robot manipulator handling an object, and then restricts the force control move direction to a linear line. In FIG. 3, a wrist of the robot manipulator is denoted 100, an object handled is denoted 101. The robot is taught that a tool point center TP should move along a linear line A1. In the case of no move restriction, when a disturbance B1 is applied to the center point TP, a force control is calculated so that TP may move toward a point P1 located on an extension line from the disturbance B1; however, in the case of the tool center point TP having been taught to restrict its move only along the linear line A1, the force control is calculated so that TP may move from P1 to P2 located straight down from P1.

Figure 4:
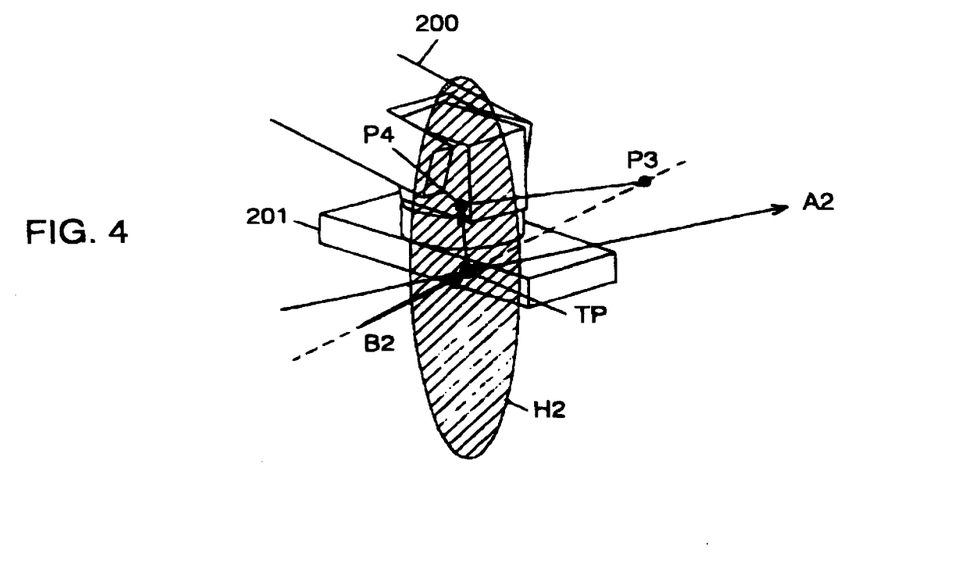
FIG. 4 illustrates, in the robot controller used in the second exemplary embodiment of the present invention, how the move restriction calculator restricts the force control direction within a plane vertical to the linear line.

FIG. 4 depicts the following case; when the robot manipulator handles the object, an external force is applied thereto, and a force control direction by the move control calculator 10b should be restricted within a plane vertical to a linear line. In FIG. 4, a robot wrist is denoted 200, and an object handled is denoted 201, and the robot has been taught so that the tool center point TP may move along a linear line A2. In the case of not move restriction, when a disturbance B2 is applied to the center point TP, a force control is calculated so that TP may move toward a point P3 located on an extension line from the disturbance B2; however, in the case of the tool center point TP having been taught to restrict its move only within a plane H2 vertical to the linear line A2, the force control is calculated so that TP may move from the point P3 to a point P4 located on the plane H2 straight down from the point P3.

Figure 5:
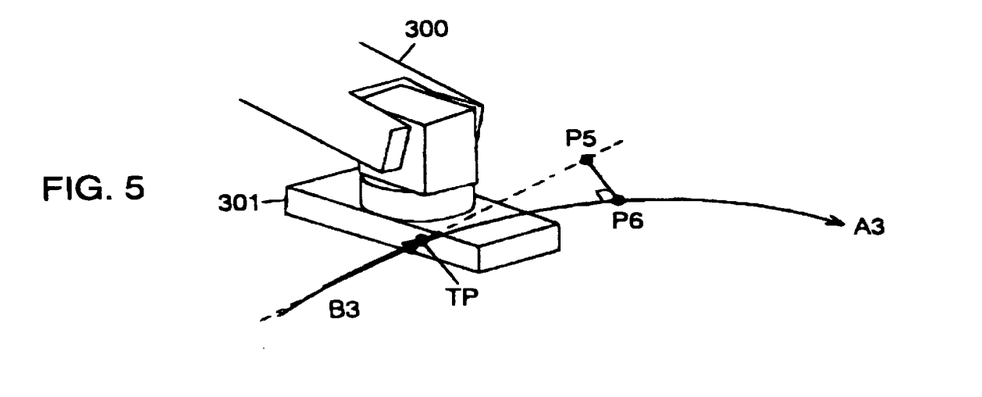
FIG. 5 illustrates, in the robot controller used in the second exemplary embodiment of the present invention, how the move restriction calculator restricts the force control direction within a plane vertical to the circular arc.

FIG. 5 depicts a case where the move restriction calculator 10b calculates a direction of a force control when an external force is applied to the robot manipulator handling an object, and then restricts the force control move direction along a circular arc. In FIG. 5, a wrist of the robot manipulator is denoted 300, an object handled is denoted 301. The robot is taught that a tool point center TP should trace a circular arc A3. In the case of no move restriction, when a disturbance B3 is applied to the center point TP, a force control is calculated so that TP may move toward a point P5 located on an extension line from the disturbance B3; however, in the case of the tool center point TP having been taught to restrict to move along the circular arc A3, the force control is calculated so that TP may move from the point P5 to a point P6 located on the circular arc A3 straight down from the point P5.

Figure 6:
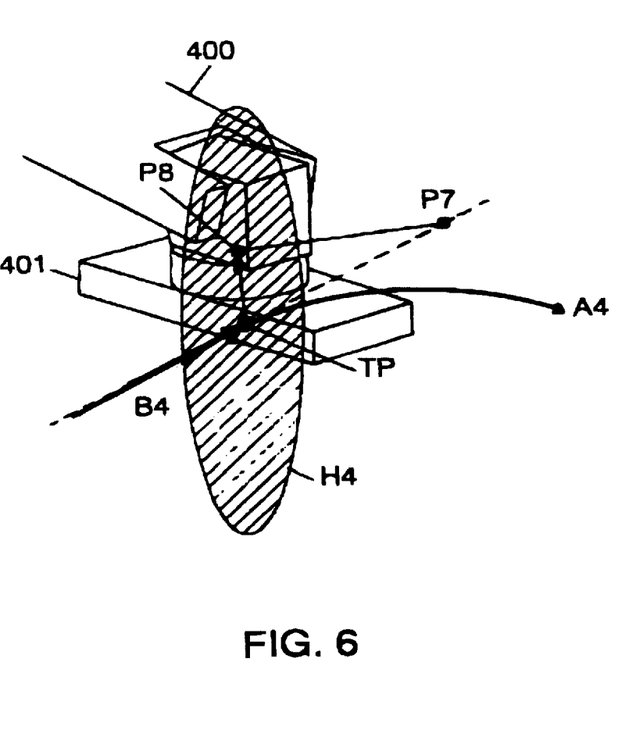

FIG. 6 depicts the following case; when the robot manipulator handles the object, an external force is applied thereto, and a force control direction by the move control calculator 10b should be restricted within a plane vertical to a circular arc. In FIG. 6, a robot wrist is denoted 400, and an object handled is denoted 401, and the robot has been taught so that the tool center point TP may move along a circular arc A4. In the case of no move restriction, when a disturbance B4 is applied to the center point TP, a force control is calculated so that TP may move toward a point P7 located on an extension line from the disturbance B4; however, in the case of the tool center point TP having been taught to restrict its move within a plane H4 vertical to the circular arc A4, the force control is calculated so that TP may move from the point P7 to a point P8 located on the plane H4 straight down from the point P7.

Figure 7:
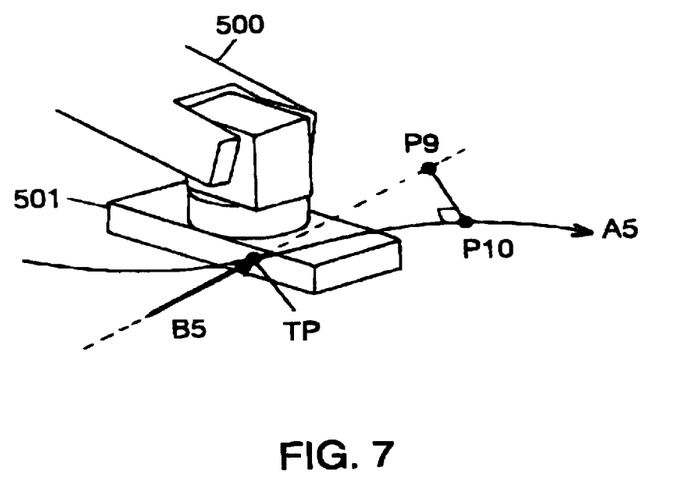
FIG. 7 illustrates, in the robot controller used in the second exemplary embodiment of the present invention, how the move restriction calculator restricts the force control direction along to an arbitrary curve.

FIG. 7 depicts a case where the move restriction calculator 10b calculates a direction of a force control when an external force is applied to the robot manipulator handling an object, and then restricts the force control move direction along an arbitrary curve. In FIG. 7, a wrist of the robot manipulator is denoted 500, an object handled is denoted 501. The robot is taught that a tool point center TP should move along an arbitrary curve A5. In the case of no move restriction, when a disturbance B5 is applied to the center point TP, a force control is calculated so that TP may move toward a point P9 located on an extension line from the disturbance B5; however, in the case of the tool center point TP having been taught to restrict to move along only the arbitrary curve A5, the force control is calculated so that TP may move from the point P9 to a point P10 located on the arbitrary curve A5 straight down from the point P9.

Figure 8:
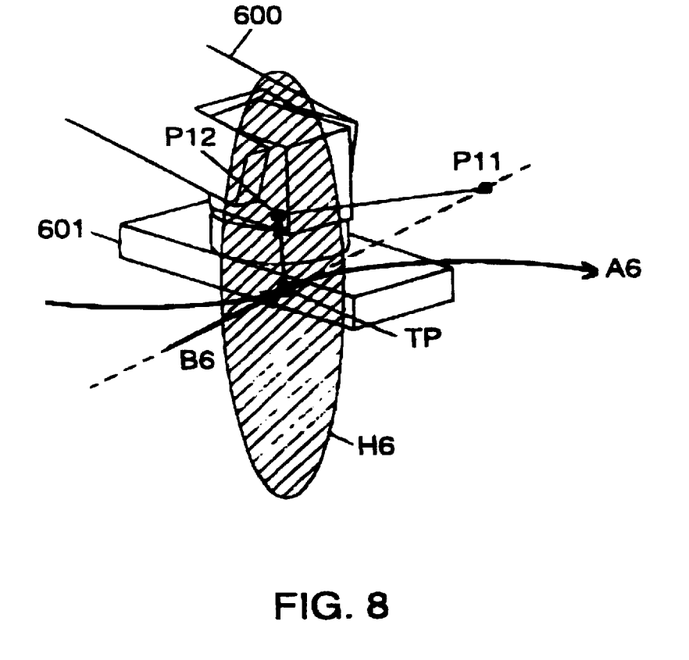
FIG. 8 illustrates, in the robot controller used in the second exemplary embodiment of the present invention, how the move restriction calculator restricts the force control direction within a plane vertical to the arbitrary curve.

FIG. 8 depicts the following case; when the robot manipulator handles the object, an external force is applied thereto, and a force control direction by the move control calculator 10b should be restricted within a plane vertical to a tangent line of an arbitrary curve. In FIG. 8, a robot wrist is denoted 600, and an object handled is denoted 601, and the robot has been taught so that the tool center point TP may move along an arbitrary curve. In the case of no move restriction, when a disturbance B6 is applied to the center point TP, a force control is calculated so that TP may move toward a point P11 located on an extension line from the disturbance B6; however, in the case of the tool center point TP having been taught to restrict its move only within a plane H6 vertical to the tangent line of the arbitrary curve A5, the force control is calculated so that TP may move from the point P11 to a point P12 located on the plane H6 straight down from the point P11.

Figure 9A:
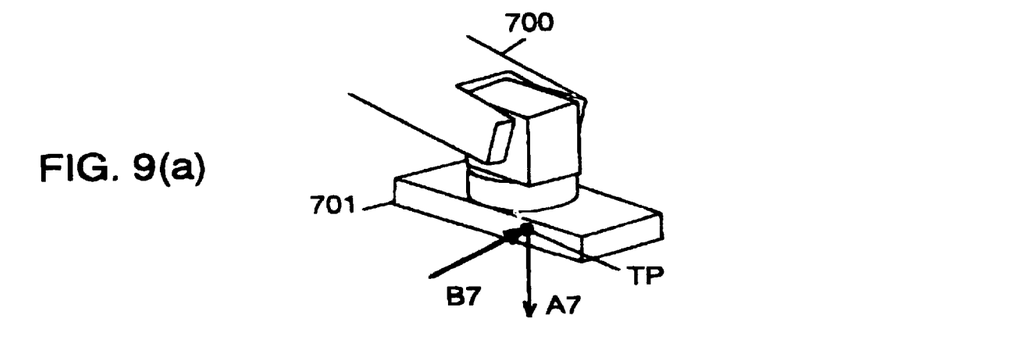
FIGS. 9(a)–9(c) illustrate, in the robot controller used in the first or second exemplary embodiment of the present invention, how the move restriction calculator restricts the force control so that a tool direction may not be changed.
Figure 9B:
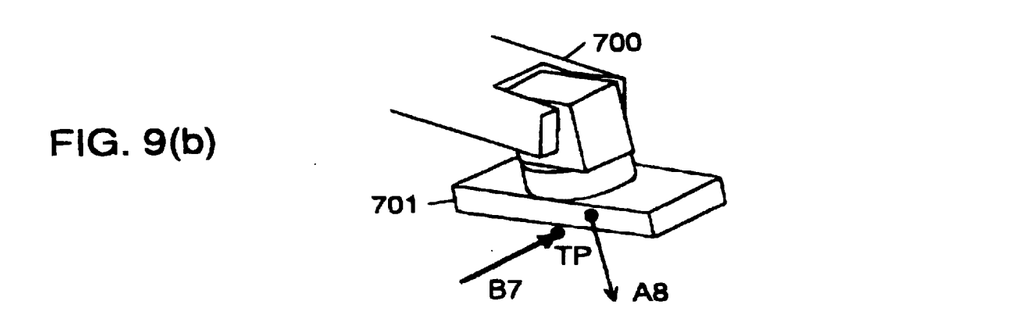
Figure 9C:
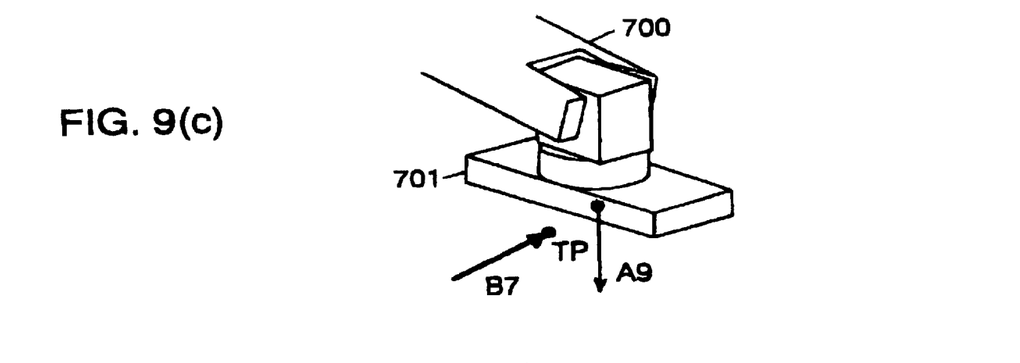

FIGS. 9(a), 9(b), 9(c) depict a case where the move restriction calculator 10a or 10b which calculates a force control direction is controlled so that a tool direction may not be changed, when a disturbance torque is loaded to a robot in handling an object. In FIG. 9(a), a robot wrist is denoted 700, an object handled is denoted 701. The tool faces toward a direction A7. When a disturbance B7 is applied to a tool center point TP, the tool direction is changed to A8 if a force control is calculated without considering the tool facing direction as shown in FIG. 9(b). At this time, if a force control is calculated so that the tool direction may not be changed, the tool center point moves so that a tool direction A9, as shown in FIG. 9(c), may not be influenced by a calculation of the move restriction calculator 10a or 10b.

As explained above, according to the first exemplary embodiment, the robot controller of the present invention comprises the following items:

1. a servo motor which drives a robot manipulator,
2. a motor current detector which detects a motor current driving the servo motor,
3. a motor rotational speed detector which detects a rotational speed of the servo motor,
4. a disturbance detector which detects a disturbance torque loaded on the motor by using the motor rotational speed and the motor current, when an external force is applied to the robot manipulator,
5. a force control calculator which calculates a force-control-instruction value of the robot manipulator responsive to the disturbance torque detected by the disturbance detector, and
6. a move restriction calculator which adds the force-control-instruction value to a regular position-instruction value.

The move restriction controller finally outputs a position-instruction value, thus the robot can be force controlled even moving in a playback mode without using a force sensor. In the playback mode, when an external force is applied to the robot manipulator, the robot manipulator can be controlled flexibly such as following the external force in order to avoid being damaged. As a result, an inexpensive and safety robot system can be composed according to the present invention.

The second exemplary embodiment shows almost the same structure as the first exemplary embodiment, thus it proves the force control can be available in the playback mode without using the force sensor. Further, according to the means depicted in FIG. 3 through FIG. 8, the move restriction calculator used in the first exemplary embodiment is replaced with another move restriction calculator in the second exemplary embodiment. The another move restriction calculator receives a move-restriction-direction-instruction value in addition to the regular position-instruction value and the force-control-instruction value, and then outputs the position-instruction value. Thus, the robot controller can indicate a force control direction regardless a direction of an external force applied to. When an external force is applied to the robot manipulator in the playback mode, the robot manipulator can be controlled to move toward a pre-taught direction in order to avoid being damaged. As a result, a robot of highly flexible against an external force, and of highly practical as well as safety can be composed with ease and inexpensively.

Further, according to the means shown in FIGS. 9(a)–9(c), the move restriction calculator used in the first or second exemplary embodiment is so structured as adding a force-control-instruction value to the regular position-instruction value, whereby a tool direction can be force controlled so that the tool direction may not be changed when a disturbance source applies an external force, which is not so strong as locking the robot manipulator completely, to the robot manipulator. For example, the robot controller according to the present invention can remove a change of an object being greatly slanted during a transfer, and thus safety of the robot can be improved.

What is claimed is:

1. A robot controller comprising:
   (a) a servo motor for driving a robot manipulator,
   (b) a motor current detector for detecting a motor current driving said servo motor,
   (c) a motor rotational speed detector for detecting a rotational speed of said servo motor,
   (d) a disturbance detector for detecting a disturbance torque loaded to said servo motor by using the motor rotational speed detected by said motor rotational speed detector and the motor current detected by said motor current detector, when an external force is applied to the robot manipulator,
   (e) a force control calculator for calculating a force-control-instruction value of the robot manipulator responsive to the disturbance torque detected by the disturbance detector, and
   (f) a move restriction calculator for adding the force-control-instruction value to a regular position-instruction value.

2. A robot controller comprising:
   (a) a servo motor for driving a robot manipulator,
   (b) a motor current detector for detecting a motor current driving said servo motor,
   (c) a motor rotational speed detector for detecting a rotational speed of said servo motor,
   (d) a disturbance detector for detecting a disturbance torque loaded to said servo motor by using the motor rotational speed detected by said motor rotational speed detector and the motor current detected by said motor current detector, when an external force is applied to the robot manipulator,
   (e) a force control calculator for calculating a force-control-instruction value of the robot manipulator responsive to the disturbance torque detected by the disturbance detector, and
   (f) a move restriction calculator which modifies a force control direction in accordance with a move-direction-instruction value, and which adds the force-control-instruction value to a regular position-instruction value in order to maintain said robot manipulator along a predetermined direction.

3. The robot controller of claim 2, wherein the move restriction calculator adds the force-control-instruction value to the regular position-instruction value so that a tool center point of the robot manipulator can move along a predetermined linear line direction.

4. The robot controller of claim 2, wherein the move restriction calculator adds the force-control-instruction value to the regular position-instruction value so that a tool center point of the robot manipulator can move within a plane vertical to a predetermined linear line direction.

5. The robot controller of claim 2, wherein the move restriction calculator adds the force-control-instruction value to the regular position-instruction value so that a tool center point of the robot manipulator move along a predetermined circular arc.

6. The robot controller of claim 2, wherein the move restriction calculator adds the force-control-instruction value to the regular position-instruction value so that a tool center point of the robot manipulator can move within a plane vertical to a tangent line of a predetermined circular arc.

7. The robot controller of claim 2, wherein the move restriction calculator adds the force-control-instruction value to the regular position-instruction value so that a tool center point of the robot manipulator can move along a predetermined curve.

8. The robot controller of claim 2, wherein the move restriction calculator adds the force-control-instruction value to the regular position-instruction value so that a tool center point of the robot manipulator move within a plane vertical to a tangent line of a predetermined curve.

9. The robot controller of claim 1 or claim 2, wherein the move restriction calculator adds the force-control-instruction value to the regular position-instruction value so that a tool direction remains in a predetermined direction.

10. The robot controller of claim 1 or claim 2, wherein an output of said move restriction calculator is coupled to said servo motor so as to control said servo motor and compensate for said disturbance torque.

11. The robot controller of claim 10, wherein said move restriction calculator functions to control a plurality of said servo motors.

12. The robot controller of claim 11, wherein said move restriction calculator receives input signals from a plurality of disturbance detector, each one of said disturbance detectors corresponding to one of said plurality of servo motors.

* * * * *